April 13, 1954 D. C. WEBSTER 2,675,291

RECORDING MECHANISM

Filed March 2, 1951 5 Sheets-Sheet 1

INVENTOR.
DONALD C. WEBSTER
BY
Naylor and Lassagne
ATTORNEYS

April 13, 1954

D. C. WEBSTER 2,675,291

RECORDING MECHANISM

Filed March 2, 1951

5 Sheets-Sheet 2

INVENTOR.
DONALD C. WEBSTER
BY
Naylor and Lassagne
ATTORNEYS

RECORDING MECHANISM

Filed March 2, 1951

INVENTOR.
DONALD C. WEBSTER
BY
Naylor and Lassagne
ATTORNEYS

April 13, 1954 D. C. WEBSTER 2,675,291

RECORDING MECHANISM

Filed March 2, 1951 5 Sheets-Sheet 4

INVENTOR.
DONALD C. WEBSTER
BY
Naylor and Lassagne
ATTORNEYS

April 13, 1954 D. C. WEBSTER 2,675,291

RECORDING MECHANISM

Filed March 2, 1951 5 Sheets-Sheet 5

Inventor
DONALD C. WEBSTER

By Naylor and Lassagne

Attorneys

Patented Apr. 13, 1954 2,675,291

UNITED STATES PATENT OFFICE 2,675,291

RECORDING MECHANISM

Donald C. Webster, Altadena, Calif., assignor to Librascope, Incorporated, Glendale, Calif., a corporation of California Application March 2, 1951, Serial No. 213,607

10 Claims. (Cl. 346—29)

This invention relates to a recording mechanism, and more particularly to a coordinate point plotter mechanism adapted to receive successive inputs which may, for instance, represent pairs of values defining points and collectively defining a linear or curved path, to simultaneously translate the input signals indicative of the values defining each point into mechanical motion, and to cause the output mechanical motion to move a stylus in a plotting movement over a chart.

The embodiment of the invention herein disclosed consists essentially of the combination of a chart, a stylus assembly mounted for movement to allow the stylus, or plotting element, to move in two mutually perpendicular directions and thus make all points on the chart accessible to the stylus, and a stylus drive system. This comprises a pulley-supported cable connected with the stylus and having a driving connection with each of two driver pulleys, or drums. A differential is arranged in driving relation with each of the driver drums, and abscissa and ordinate value input means are provided for the differentials; each of said input means being operable through the differential, pulley and cable system to effect a movement of the stylus with respect to the chart in a direction normal to the direction of movement of the stylus effected by the other input means. The plotter mechanism of the invention preferably also includes means whereby the chart may be maintained in curve inscribing contact with the stylus or brought out of contact with the stylus when point plotting as distinguished from curve inscribing is desired.

As will hereinafter appear, the point plotter of the invention has broad utility and is particularly useful for providing continuous graphic representations of values.

Further objects and advantages of the invention will be apparent from the following description taken in conjunction with the drawings forming part of this specification, and in which:

Figure 3 is a schematic drawing of a plotter mechanism embodying the present invention;

Figure 1:
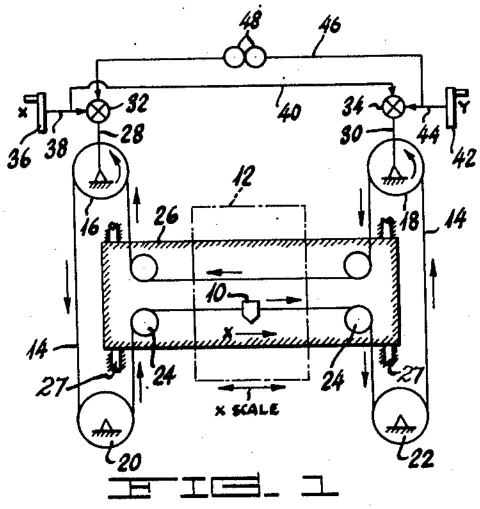
Figure 1 is a schematic illustration of the basic elements comprising the subject plotter mechanism, showing the operational relationship of these elements when only one of the coordinate value input means is operated.
Figure 2:
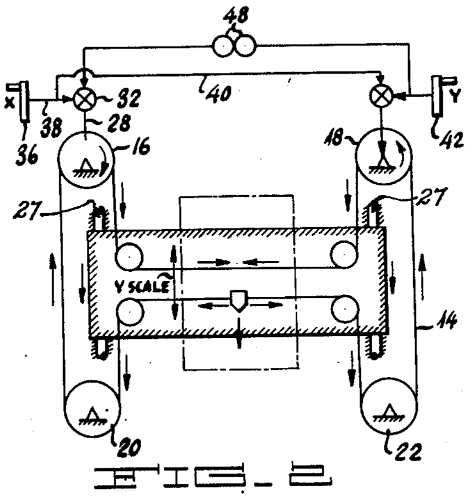
Figure 2 is a schematic illustration similar to that of Figure 1, but showing the operational relationship of the elements of the plotter mechanism when only the other coordinate value input means is operated.

Referring to Figures 1 and 2, which schematically illustrate the basic elements of a plotter mechanism embodying the present invention, 10 is a stylus located over a stationary chart or recording sheet 12. Means are provided to cause the stylus to move either vertically or horizontally with respect to the chart, or in a direction which is the resultant of simutaneously induced vertical and horizontal movements, to inscribe or plot on the chart an appropriate graph or series of points. The control means for the stylus comprise a cable 14 to which the stylus is secured; driver drums 16 and 18 around which the cable is wound to prevent slippage upon the drums upon rotation of the latter; fixedly positioned idler drums 20 and 22 for the cable, and rotatable pulleys 24 positioned on a carriage 26 mounted for reciprocatory movement on guide rods 27.

The driver drums 16 and 18 are adapted to be driven, respectively, by shafts 28 and 30 connected to the output sides of differentials 32 and 34. Values along the horizontal or X axis of the chart 12 are entered into the system by means here illustrated as a rotary input crank 36 connected to one of the side gears of differentials 32 and 34 by drive elements 38 and 40, while values along the vertical or Y axis of the chart may be simultaneously introduced into the system by rotary crank 42 connected through drive element 44 to the other side gear of differential 34 and through drive element 46 and reversing gears 48 to the other side gear of differential 32. The ratio of the gearing in differentials 32 and 34 is such that angular rotations of inputs 36 and 42, respectively, will produce equal angular rotations of outputs 28 and 30 respectively.

The direction of movement of the cable and the driver drums when a positive value of X is introduced into the system by input crank 36 is illustrated in Figure 1. The input value is introduced through the differentials to the drums 16 and 18 to cause these drums to move in the same direction of rotation, here shown (by the arrows) as counterclockwise. The cable is thus caused to move in the direction of the arrows in such manner that the stylus 10 is moved horizontally to the right, with no pull being exerted on the carriage 26 to tend to cause it to slide in a vertical direction. The position of the stylus with respect to the chart 12 at the end of the input of the X value is representative of the input value.

Figure 2 illustrates the direction of movement of the driver drums and cable when a Y value is introduced into the system by rotation of the input crank 42. Mechanical movement is transmitted to both of the drums 16 and 18, but they rotate in opposite directions because the driving connection between crank 42 and drum 16 includes the one-to-one ratio reversing gears 48. The particular directions of rotation of the driver drums and movement of the cable shown are for a negative input value of Y, and it will be seen that since both of the driver drums equally take up the cable over the idler drums 20 and 22, the carriage 26 will be moved vertically downwardly, while the stylus will be stationary with respect to the horizontal or X axis. Thus, when the rotation of the driver drums ceases, the position of the stylus with respect to the chart will be representative of the Y value introduced into the system.

When X and Y values are simultaneously introduced into the system, the above described movements of the stylus will be combined by the action of differentials 32 and 34, with the result that the stylus will be caused to move in a path passing through the various points defined by the various pairs of X and Y values. In this operation differential 32 rotates drum 16 an amount equal to X+Y while differential 34 rotates drum 18 an amount equal to X−Y.

Figure 5:
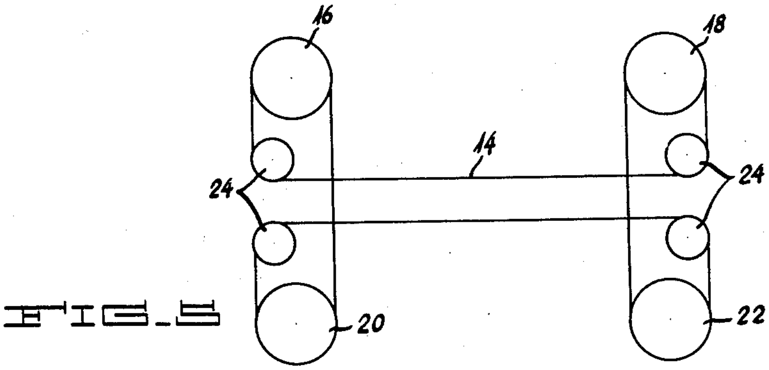
Figures 5 and 6 illustrate schematically alternate forms of the cable and pulley drive systems for the stylus.
Figure 6:
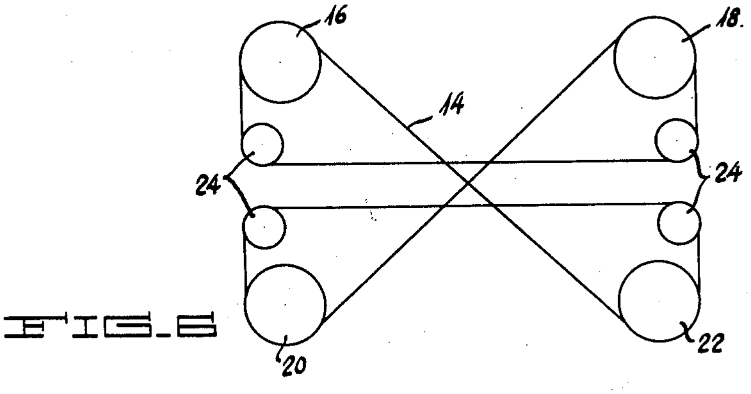
Figure 2:
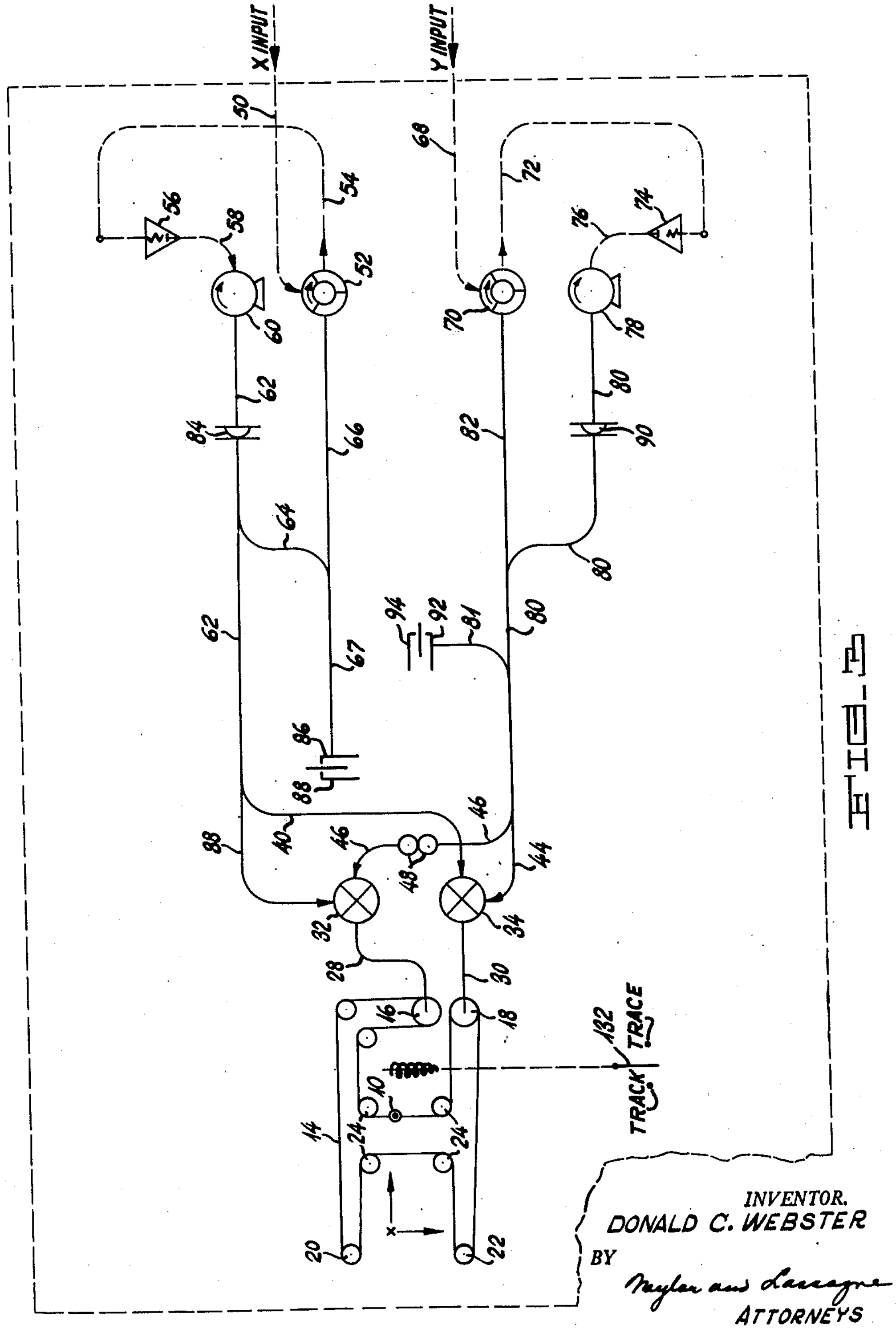

Alternative drum, pulley and cable arrangements, operable in a fashion similar to that described for the arrangement shown in Figures 1 and 2, are illustrated in Figures 5 and 6, with the corresponding elements of the cable system being designated by the same reference numerals used for Figures 1 and 2.

Figure 3 schematically illustrates a manner in which the basic plotter system of Figures 1 and 2 may be embodied in an electro-mechanical instrument particularly adapted for use to convert electrically input values indicative of any desired X and Y values into a chart which may be either a graph or a series of points. Wherever possible in the drawings, like elements are designated by similar reference numerals. In Figure 3 the manual value input cranks 36 and 42 of Figures 1 and 2 have been replaced with means to receive electrical signals, corresponding respectively to X and Y values, and to process these sound signals so that the recording stylus will be mechanically moved along a track on which at any given instant the position of the stylus with respect to the coordinate axes of the chart will represent the two values.

In the illustrated embodiment a continuous signal, as received from a synchro-generator, not shown, is transmitted along input line 50 (Figure 3) to a control transformer 52. The transformer is thus unbalanced to provide an output voltage signal along line 54 to amplifier 56, wherein the voltage signal is amplified sufficiently and transmitted along line 58 to control servo-motor 60. Servo-motor 60 then rotates drive elements 62, 64 and 66 to mechanically balance the control transformer 52, at which time the output voltage signal along 54 ceases and the servo-motor driven element 62 stops rotating. While in the process of balancing the transformer, drive element 62 also rotates drive elements 38 and 40 to additively introduce into differentials 32 and 34 an input proportional to the value represented by the signal passed to the transformer along signal input line 50. The differentials drive output shafts 28 and 30 which, respectively, drive cable driver drums 16 and 18 in the manner previously described to cause an adjustment of stylus 10 along the X axis of the chart.

In similar fashion, a continuous signal is received along line 68 and transmitted to a second control transformer 70. The output voltage signal from transformer 70 caused by the unbalance of the transformer is transmitted along 72 to amplifier 74 from which it is passed along 76 to servo-motor 78. Servo-motor 78 then tends to mechanically balance the transformer 70 through drive elements 80 and 82, and at the same time element 80 rotates drive elements 44 and 46 to introduce input values into the differentials 32 and 34 in the manner previously described.

Drive element 62 embodies a slip clutch 84 the output side of which is connected through drive elements 64 and 67 to a limit stop 86 preferably in the form of a hunting tooth gear, said limit stop 86 being associated with a fixed hunting tooth gear stop 88 preset to enable the full range chart movement of stylus 10 along the X or range axis before stop 88 engages stop 86 and prevents further rotation of differential input elements 38 and 40. When this occurs, the servo-motor output element 62 is free to turn, but no motion is transmitted through the slip clutch 84 to the differentials. Similarly, servo-motor output element 80 is connected through slip clutch 90 to drive element 81 terminating in limit stop 92 associated with fixed limit stop 94 preset to enable the full range chart movement of the stylus along the Y or depth axis. After this limit is reached, slip clutch 90 allows the servo-motor shaft to turn without disturbing the setting of the stylus and the intermediate gear and shaft connections.

Figure 4:
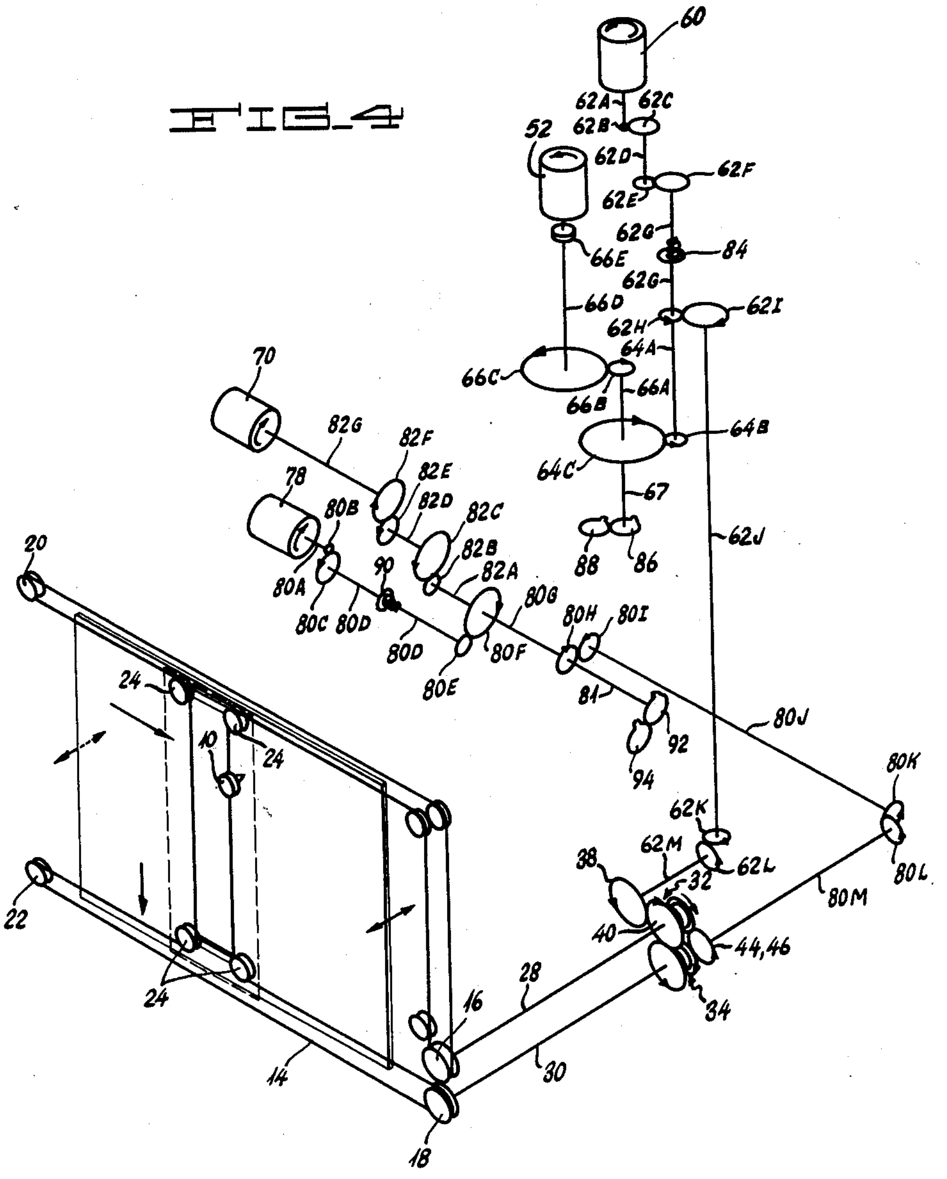
Figure 4 is a schematic illustration in perspective of the gear train elements of the system of Figure 3 and their cooperative relationship with the plotting elements of the mechanism.

Figure 4 illustrates the system of Figure 3, with the various mechanical drive elements of Figure 3 being shown as schematically illustrated gear trains. It will be apparent from a comparison of these two figures that each of the mechanical drive components schematically shown in Figure 3 may comprise a plurality of actual driving elements, such as gears and shafts. For example, the mechanical drive component 62 of Figure 3 is shown in Figure 4 as comprising shaft 62A connected to the output side of servo-motor 60, gears 62B and 62C, shaft 62D, gears 62E and 62F, shaft 62G including therein the slip clutch 84, gears 62H and 62I, shaft 62J, gears 62K and 62L and shaft 62M carrying drive element or gear 38 which is directly connected to an input of the differential 32. In like manner it will be seen that each of the mechanical drive components, 64, 66, 80 and 82, are comprised of a plurality of specific driving elements.

Figure 7:
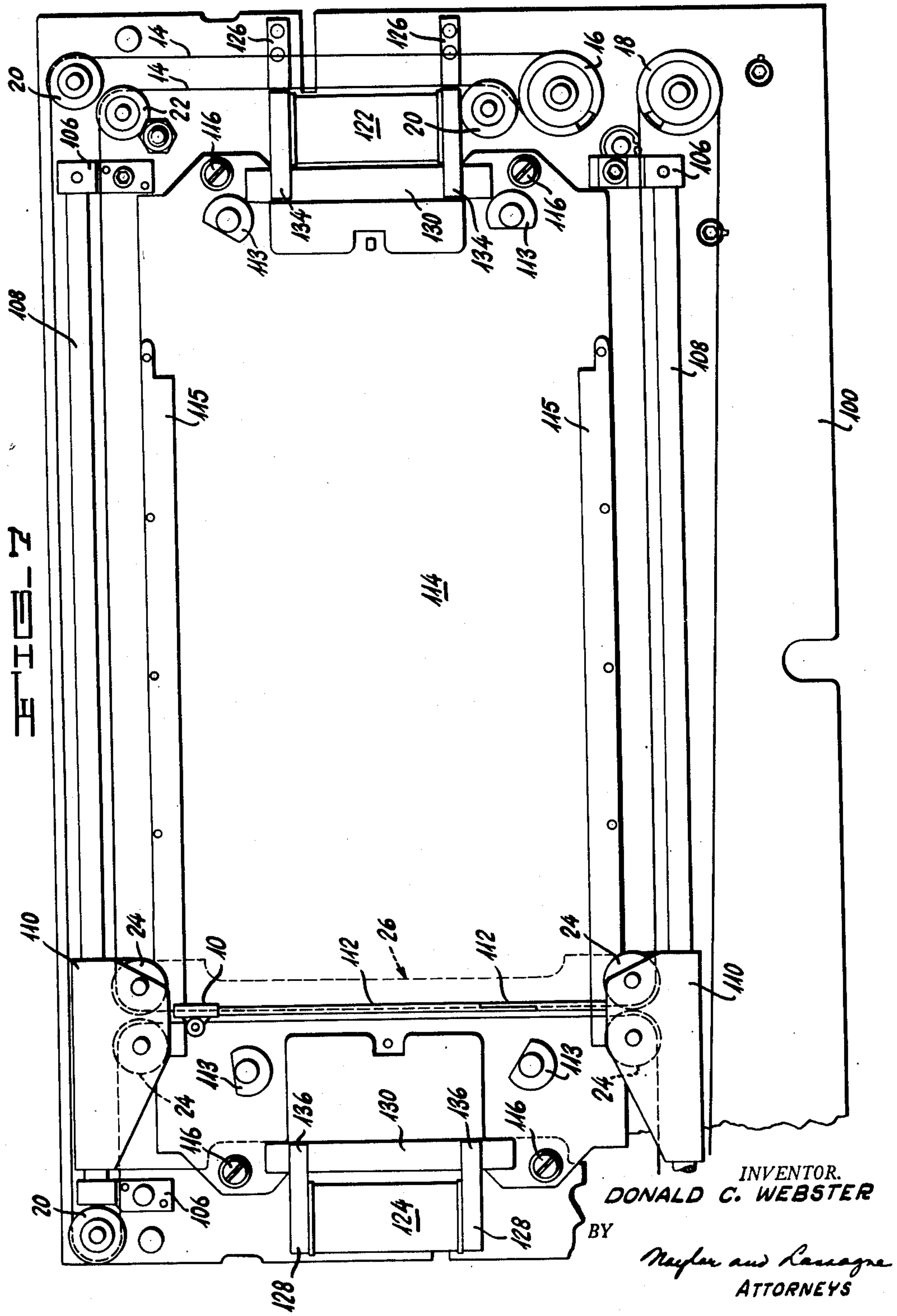
Figure 7 is a view in front elevation of a structural embodiment of the chart plate mechanism of the invention as schematically illustrated in Figure 3.
Figure 8:
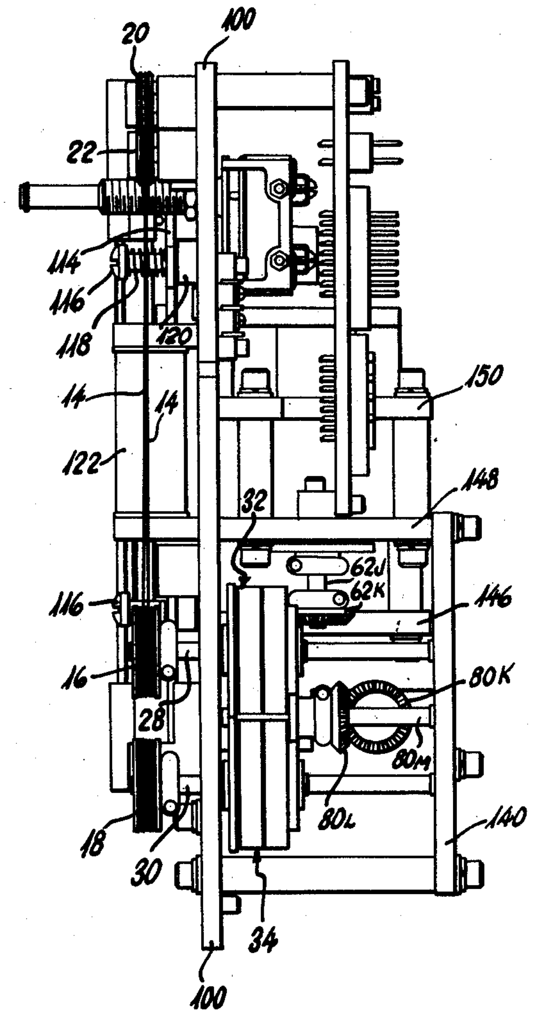
Figure 8 is a view in right side elevation of the assembly of Figure 7.

A structural embodiment of the chart plate mechanism of the plotter is shown in Figures 7 and 8. Figure 7 illustrates the front or chart side of the assembly. The principal supporting member for the assembled elements of the system is a main plate 100 having secured thereto brackets 106 supporting guide tubes 108 on which is slidable the carriage or traveller 26. This carriage comprises upper and lower end brackets 110 interconnected by a non-circular rod 112 on which stylus assembly 10 is slidably mounted. The brackets 110 of the traveller or carriage 26 have journalled therein the rotatable pulleys 24 about which the cable 14 passes in the manner previously described. The cable 14 is attached to the stylus assembly 10 and the cable passes over idler pulleys 20 and 22 (the lower leftmost of which is not shown) and in multiple turns around helically grooved cable driver drums 16 and 18 which are mounted on shafts supported by the plate 100. Driver drums 16 and 18 should therefore have sufficient frictional engagement with the cable to drive it without slippage. This may be accomplished, as shown in Figure 8, by passing the cable a plurality of times around each drum; the drums being preferably helically grooved for the purpose.

A chart plate 114, having upper and lower chart guides 115, is mounted between the stylus assembly 10 and support plate 100 and is carried for movement toward and away from the stylus assembly on four studs 116 carried by plate 100. The chart plate is urged by springs 118 (see also Figure 8) maintained in compression between plate 114 and the heads of studs 116, against resilient washers 120 carried on the studs adjacent main plate 100. Four rotatable truncated circular clamps 113 carried by chart plate 114 serve to clamp the chart paper flat against this plate. When a sheet of chart paper is carried by the plate 114, the stylus does not engage the paper when the plate is maintained by the springs against the washers 120, and in this position of the chart plate the stylus merely moves along the curve being determined by the input values.

Two magnet assemblies 122 and 124 (Figure 7) connected to plate 100 by brackets 126 and 128 are provided so that when it is desired to record either the curved or a point on the graph paper, which is preferably sensitized with wax for this purpose, the energization of the magnets will raise the chart plate 114 to bring the chart against the stylus. The chart plate 114 has secured thereto at each end a magnet armature bar 130, and upon energization of the magnets, as by movement of the switch 132 (Figure 3) to the trace position, the magnet assemblies 122 and 124 exert a strong pull on the armature bars 130, and this results in a raising of the chart plate against the action of springs 118 to bring it into contact with the stylus. Upper limit stops 134 and 136 carried, respectively, by magnet assemblies 122 and 124, halt the movement of the chart plate so that the stylus will not be damaged by the rapid and abrupt movement of the plate to a position where either the curve can be traced on the chart paper or a point will be marked thereon. Movement of the chart plate control switch 132 to the track position, as indicated in Figure 3, results in de-energization of the magnet assemblies and consequent spring urged removal of the chart plate from engagement with the stylus. Thus by momentary energization and de-energization of the magnets 122 and 124 only points may be marked.

The main plate 100 is provided preferably with other mounting plates, such as 140, 142, 144, 146, 148 and 150, shown in Figure 8, serving as the structural support elements in conjunction with the main plate 100 for the various control and mechanical drive components of the mechanism shown in Figures 1 to 4.

I claim:

1. A recorder comprising a support member, a chart plate mounted thereon, a pair of parallel guide members mounted on said support member, a carriage mounted on said guide members for movement across said plate, a stylus member slidably mounted on said carriage for movement at a right angle to the direction of movement of said carriage and adapted to overlie all points within the margins of the chart area of said plate, and means for moving said stylus member to any point within the confines of the chart area of said plate comprising two pairs of opposed pulleys disposed in a plane parallel to that of said chart plate and carried by said carriage, a cable having a portion extending lengthwise of said carriage, passing around one pair of said pulleys, extending in a direction parallel to the line of travel of the carriage, and passing around rotatable driver drums, said cable having another portion extending lengthwise of said carriage, passing around the second pair of said pulleys, extending therefrom oppositely to said first cable portion to points beyond the edge of the chart area of said plate, passing over rotatable idler drums, and returning to said driver drums, a fixed connection between said cable and said stylus member, means for connecting said cable to said driver drums to provide a positive two-way driving connection between said drums and said cable, and actuating means connected to said driver drums.

2. A recorder as set forth in claim 1 wherein said actuating means comprises a differential for each driver drum having its spider in driving relation to the drum, first means rotatable in direct proportion to one value of a coordinate value pair defining a point, said means being in driving relation to a side gear of each differential and being operable to cause rotation of said driver drums in the same direction, second means rotatable in direct proportion to the other value of a pair of values defining a point, said means being in driving relation to the remaining side gear of each differential, said second means having a reversing gear connection with one of said side gears to cause rotation of said driver drums in opposite directions.

3. A recorder as set forth in claim 1 having a value input means for each of the abscissa and ordinate values defining a point to be plotted, one of said input means being operable during inactivity of the other to rotate said driver drums an equal amount in the same direction, and the other of said input means being operable during inactivity of the other to rotate said driver drums an equal amount in opposite directions, with said coordinate point value input means comprising a differential for each driver drum having its spider in driving relation to the drum, first means for translating one coordinate value into rotary motion, said means being in driving relation to a side gear of each differential, second means for translating the other coordinate value into rotary motion, said means being in driving relation to the remaining side gear of each differential, said second means having a reversing gear connection with one of said side gears.

4. In a device of the character described, a support member, a carriage, means movably mounting said carriage on said support member and constraining it to a linear path of movement, a movable device, means movably mounting said device on said carriage and constraining it to a linear path of movement thereon at a right angle to the path of movement of said carriage, four cable guides mounted on said carriage, four cable guides mounted on said support member, and means for effecting relative movement between said carriage and said support member and/or between said device and said carriage comprising a cable having two runs paralleling the path of movement of said device on said carriage, one of said runs being connected to said device; said two runs extending thence around said carriage-mounted cable guides into runs paralleling the path of movement of said carriage, and thence around said support-member-mounted cable guides into runs extending between pairs of said last mentioned cable guides.

5. A device according to claim 4 in which two of said support-member-mounted cable guides are rotatable members in driving engagement with said cable, characterized by the provision of driving means for said rotatable members comprising a pair of differential mechanisms each having two inputs and an output, a driving connection between each of said outputs and one of said members, a first driving element having a direct operating connection with an input of each of said differential mechanisms whereby actuation of said element may cause said members to be rotated in the same direction, and a second driving element having a direct operating connection with the second input of one of said differential mechanisms and an operating connection including reversing mechanism with the second input of the other of said differential mechanisms whereby actuation of said second element may cause said members to be rotated in opposite directions.

6. In a recorder of the character described, a movable recording stylus, means for moving said stylus including a pair of rotatable members and a common operating connection between said pair of members and said stylus; said means being operable upon rotation of said members in the same direction to move said stylus in one path and upon rotation of said members in opposite directions to move said stylus in a path at a right angle to said one path, in combination with driving means for said members comprising a pair of differential mechanisms each having two inputs and an output, a driving connection between each of said outputs and one of said members, a first driving element having a direct operating connection with an input of each of said differential mechanisms whereby actuation of said element may cause said members to be rotated in the same direction, and a second driving element having a direct operating connection with the second input of one of said differential mechanisms and an operating connection including reversing mechanism with the second input of the other of said differential mechanisms whereby actuation of said second element may cause said members to be rotated in opposite directions.

7. In a recorder of the character described a support member, a carriage, means movably mounting said carriage on said support member and constraining it to a linear path of movement, a movable device, means movably mounting said device on said carriage and constraining it to a linear path of movement thereon at a right angle to the path of movement of said carriage, four cable guides mounted on said carriage, four cable guides mounted on said support member, means for effecting relative movement between said carriage and said support member and/or between said device and said carriage comprising a cable having two runs paralleling the path of movement of said device on said carriage, one of said runs being connected to said device; said two runs extending thence around said carriage-mounted cable guides into runs paralleling the path of movement of said carriage, and thence around said support-member-mounted cable guides into runs extending between pairs of said last mentioned cable guides, and driving means for two of said support-member-mounted cable guides comprising a pair of differential mechanisms each having two inputs and an output, a driving connection between each of said outputs and one of said two guides, a first driving element having a direct operating connection with an input of each of said differential mechanisms whereby actuation of said element may cause said two guides to be rotated in the same direction, and a second driving element having a direct operating connection with the second input of one of said differential mechanisms and an operating connection including reversing mechanism with the second input of the other of said differential mechanisms whereby actuation of said second element may cause said two guides to be rotated in opposite directions.

8. A recorder comprising a support member, a chart plate mounted thereon, a pair of parallel guide members mounted on said support member, a carriage mounted for movement across said plate in guided relationship with said guide members, a stylus member slidably mounted on said carriage for movement at a right angle to the direction of movement of said carriage and adapted to overlie all points within the margins of the chart area of said plate, and means for moving said stylus member to any point within the confines of the chart area of said plate comprising a pair of driver drums rotatably mounted on said support member, a pair of idler drums rotatably mounted on said support member, a series of pulleys carried by said carriage; at least two of said series being carriage traverse pulleys disposed in a plane parallel to that of said chart plate and having their axes intersecting a line parallel to the direction of movement of said carriage, and a cable having a portion extending lengthwise of said carriage and portions extending in a direction parallel to the direction of travel of said carriage; said cable being reaved from one of said carriage traverse pulleys to one of said driver drums, from said one driver drum to one of said idler drums, from said one idler drum to another of said carriage traverse pulleys, from said other of said carriage traverse pulleys to the second of said pair of idler drums, from the second of said pair of idler drums to the second of said pair of driver drums, from the second of said pair of driver drums to a third one of said series of pulleys carried by said carriage and from the said third one of said series of pulleys to said one of said carriage traverse pulleys; a fixed connection between a portion of said cable extending lengthwise of said carriage and said stylus member, means for connecting said cable to said driver drums to provide a positive two-way driving connection between said drums and said cable, and actuating means connected to said driver drums.

9. A recorder as set forth in claim 8 wherein said actuating means comprises a differential for each driver drum having its spider in driving relation to the drum, first means rotatable in direct proportion to one value of a coordinate value pair defining a point, said means being in driving relation to a side gear of each differential and being operable to cause rotation of said driver drums in the same direction, second means rotatable in direct proportion to the other values of a pair of values defining a point, said means being in driving relation to the remaining side gear of each differential, said second means having a reversing gear connection with one of said side gears to cause rotation of said driver drums in opposite directions.

10. A recorder as set forth in claim 8 having a value input means for each of the abscissa and ordinate values defining a point to be plotted, one of said input means being operable during inactivity of the other to rotate said driver drums an equal amount in the same direction, and the other of said input means being operable during inactivity of the other to rotate said driver drums an equal amount in opposite directions, with said coordinate point value input means comprising a differential for each driver drum having its spider in driving relation to the drum, first means for translating one coordinate value into rotary motion, said means being in driving relation to a side gear of each differential, second means for translating the other coordinate value into rotary motion, said means being in driving relation to the remaining side gear of each differential, said second means having a reversing gear connection with one of said side gears.

References Cited in the file of this patent

UNITED STATES PATENTS

| Number | Name | Date |
|---|---|---|
| 1,370,482 | Pope | Mar. 1, 1921 |
| 1,873,126 | Hugershoff | Aug. 23, 1932 |
| 1,979,208 | Friden | Oct. 30, 1934 |
| 2,266,825 | Streckfuss | Dec. 23, 1941 |
| 2,467,808 | Canada | Apr. 19, 1949 |